US012623864B2

(12) United States Patent
Chianura et al.

(10) Patent No.: US 12,623,864 B2
(45) Date of Patent: May 12, 2026

(54) APPARATUS FOR TRANSPORTING OBJECTS

(71) Applicant: I.M.A. INDUSTRIA MACCHINE AUTOMATICHE S.P.A., dell'Emilia (IT)

(72) Inventors: Mattia Chianura, dell'Emilia (IT); Claudio Trebbi, dell'Emilia (IT)

(73) Assignee: I.M.A. INDUSTRIA MACCHINE AUTOMATICHE S.P.A., dell'Emilia (IT)

( * ) Notice: Subject to any disclaimer, the term of this patent is extended or adjusted under 35 U.S.C. 154(b) by 174 days.

(21) Appl. No.: 18/727,409

(22) PCT Filed: Jan. 10, 2023

(86) PCT No.: PCT/IT2023/050003
§ 371 (c)(1),
(2) Date: Jul. 9, 2024

(87) PCT Pub. No.: WO2023/135616
PCT Pub. Date: Jul. 20, 2023

(65) Prior Publication Data
US 2025/0091819 A1     Mar. 20, 2025

(30) Foreign Application Priority Data

Jan. 11, 2022     (IT) ........................ 102022000000257

(51) Int. Cl.
*B65G 54/02*     (2006.01)
*B65G 61/00*     (2006.01)
*H02K 41/03*     (2006.01)

(52) U.S. Cl.
CPC ........... *B65G 54/02* (2013.01); *H02K 41/031* (2013.01); *B65G 61/00* (2013.01); *B65G 2207/40* (2013.01)

(58) Field of Classification Search
CPC .... B65G 54/02; B65G 61/00; B65G 2207/40; H02K 41/031
(Continued)

(56) References Cited

U.S. PATENT DOCUMENTS

| | | | | |
|---|---|---|---|---|
| 2017/0227617 | A1* | 8/2017 | Weinberg ............. | G01R 33/381 |
| 2022/0140762 | A1* | 5/2022 | Kimura ................. | H02P 25/064 |
| | | | | 318/135 |

(Continued)

FOREIGN PATENT DOCUMENTS

| | | |
|---|---|---|
| DE | 10 2014 225 171 | 6/2016 |
| DE | 10 2015 102 236 | 8/2016 |

(Continued)

OTHER PUBLICATIONS

International Search Report filed in PCT/IT2023/050003 mailed May 12, 2023.

*Primary Examiner* — James R Bidwell
(74) *Attorney, Agent, or Firm* — RANKIN, HILL & CLARK LLP

(57) ABSTRACT

A transport apparatus for transporting objects includes a reference surface; electric energizing device to selectively generate one or more magnetic fields associated with the reference surface; and at least one transport member configured to support and transport the objects and to move without contact with respect to the reference surface. The transport member includes a first magnetic device. The electric energizing devices are configured to interact with the first magnetic device and cause the displacement of the transport member. A second magnetic device includes at least one magnetic device configured to assume a first condition in which the magnetic device is inactive and a second condition in which the magnetic device is active and generates a magnetic attraction force suitable to interact with the first magnetic device to block the transport member with (Continued)

respect to the reference surface when a correct interaction between the electric energizing device and the first magnetic device is missing.

14 Claims, 3 Drawing Sheets

(58) Field of Classification Search
USPC .......................................................... 198/805
See application file for complete search history.

(56) References Cited

U.S. PATENT DOCUMENTS

| | | | | |
|---|---|---|---|---|
| 2022/0306406 A1* | 9/2022 | Flixeder | .................. | H02P 6/006 |
| 2023/0174312 A1* | 6/2023 | Hauer | .................... | B65G 23/23 |
| | | | | 198/619 |

FOREIGN PATENT DOCUMENTS

| | | | | |
|---|---|---|---|---|
| DE | 102016203854 A1 * | 9/2017 | ............ | H02K 55/02 |
| EP | 3451516 | 3/2019 | | |
| EP | 3793074 | 3/2021 | | |

* cited by examiner

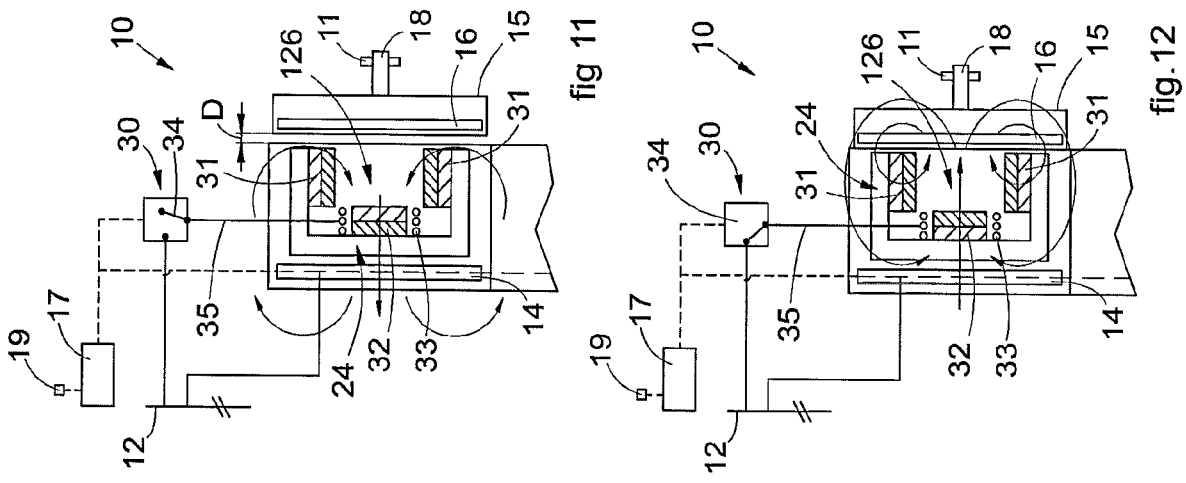
fig 11
fig.12
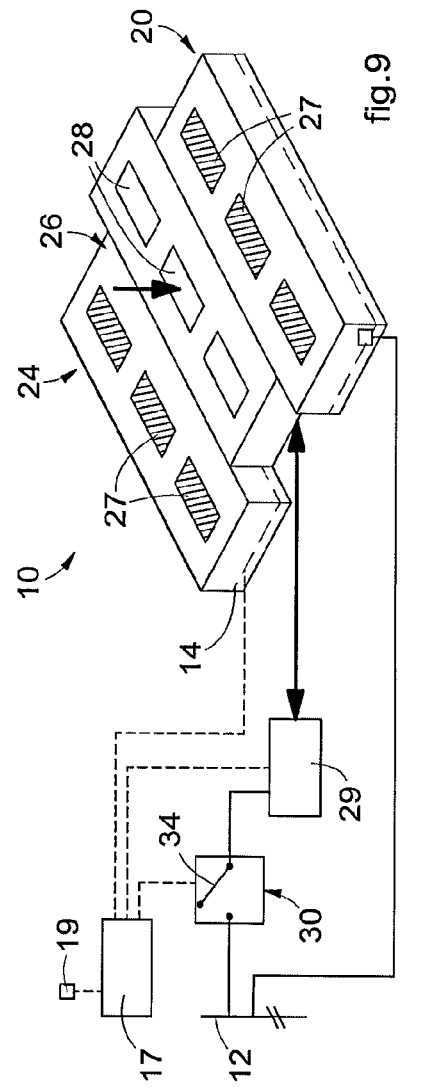
fig.9
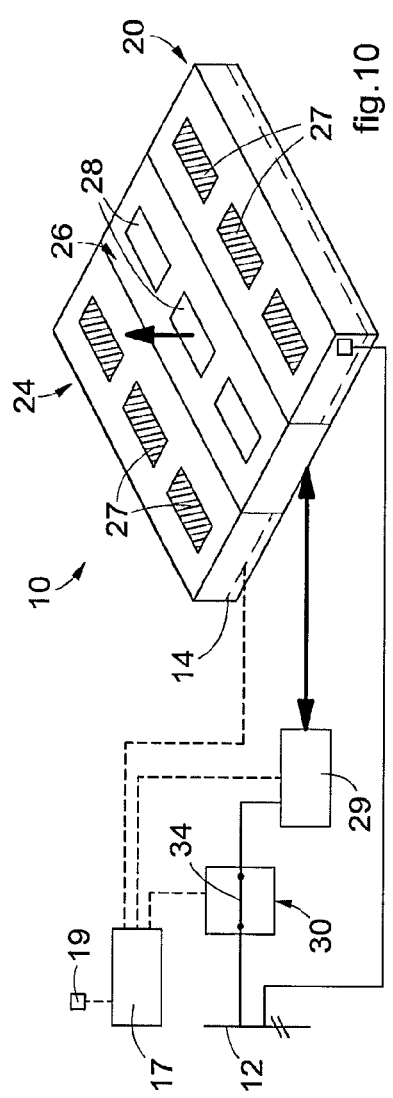
fig.10

APPARATUS FOR TRANSPORTING OBJECTS

FIELD OF THE INVENTION

The present invention concerns an apparatus for automatically transporting one or more objects, for example components for making a product or a package, to and from a plurality of processing stations. The apparatus according to the invention can be used, for example, in a machine for making packages of products, especially low-mass products, for example in the chemical, cosmetic and/or pharmaceutical sector, such as bottles, flasks, caps, ferrules or other objects of similar sizes.

BACKGROUND OF THE INVENTION

In the industrial sector of packaging chemical, cosmetic and/or pharmaceutical products, various machines and methods are known for automatically transporting one or more components to make a package, in particular a package for a low-mass product, such as bottles, flasks, caps, ferrules, or other objects of similar sizes, from and to one or more processing stations, many of which are designed, manufactured and marketed by the present Applicant.

In this sector, there is an increasing demand for machines that can move the components to make the package from one processing station to another, in a safe and aseptic, ecologically sustainable and silent environment, without generating pollutants and agents that can contaminate the product and/or its content, and in which the human intervention to carry out the usual operations in the sector (cleaning, format change, maintenance, monitoring of biological tests, or other) is reduced to a minimum, if not completely eliminated.

In particular, transport devices of the electromagnetic type have been developed, also called "planar motors", which comprise magnetic means which cooperate with associated electric energizing means and configured to selectively generate one or more magnetic fields to influence said magnetic means. In planar motors, the magnetic means are usually configured as coils included in a mobile transport member, and the electric energizing means are incorporated inside a fixed surface on which the transport member can move without contact thanks to the controlled electromagnetic field which is generated between the magnetic means and the electric energizing means.

These planar motors are very versatile, since they allow to follow trajectories and paths that are very different from each other, both with rectilinear and also with curved segments, with respect to a movement surface, suitably commanding the electric energizing means.

Furthermore, planar motors can be advantageously used both on horizontal and inclined movement surfaces, or even on vertical or upturned movement surfaces, even though in these latter cases damage can occur, even serious damage, if critical situations occur in which there is no correct interaction between the magnetic fields generated by the electric energizing means and those generated by the magnetic means present on the transport devices.

Such critical situations can occur, for example, when there is an interruption in the supply of electrical energy to the electric energizing means, with consequent cancellation of the corresponding magnetic fields and therefore of the magnetic attraction force which allows the transport devices to be kept in position with respect to the movement surface.

Planar motors which integrate a device configured as a safety system which intervenes in the event of sudden interruptions in the supply of electrical energy are described in patent application DE 102015209625 A1.

Critical situations can also occur when control of one or more transport devices is lost, even without any interruption to the electrical energy.

This can occur in the event of a request for excessive dynamic performance from the transport devices (for example in the event of strong dynamics, unbalanced loads, greater loads than expected), or also due to possible collisions between two or more transport devices, for example due to the unbalancing or slowing down of one of them, or due to possible collisions of the transport devices with other parts of the machine.

In all these critical situations, the transport device is not supported adequately and with full control by the electromagnetic fields generated by the electric energizing means and can therefore fall downward due to the force of gravity.

By carrying out operating tests on machines provided with such transport devices, the Applicant has found that, if the mobile part of the planar motors or the transport devices accidentally fall, the latter can suffer very serious damage due to the impact or coupling with any magnetic material whatsoever, and that the magnetic means inside them may even break, in practice rendering them unusable.

Since, as is known, these transport devices are very expensive and difficult to repair in the event of considerable damage to the magnetic means, it is necessary to adopt measures to guarantee their correct operation even on inclined and/or vertical surfaces.

There is therefore a need to perfect an apparatus for transporting objects which can overcome at least one of the disadvantages of the state of the art.

To do this, it is necessary to solve the technical problem of ensuring that the mobile part of each planar motor, that is, said transport device, can operate normally, in compliance with its design specifications, but at the same time that the same mobile part is prevented from falling downward, or from making any unwanted movement, in an uncontrolled manner in the event of any malfunction.

Therefore, one purpose of the present invention is to provide an apparatus for transporting objects which is reliable and not subject to the risk of damage or breakage to one or more components.

Another purpose of the present invention is to provide an apparatus for transporting objects which allows any critical situations to be managed quickly and effectively, at the same time safeguarding the integrity of the transport devices.

Another purpose of the present invention is to provide an apparatus for transporting objects which is safe and suitable for use also in machines for the chemical, cosmetic and/or pharmaceutical sector, which normally require a work environment that is substantially aseptic and free from contaminants.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, and to resolve the technical problem disclosed above in a new and original way, also achieving considerable advantages compared to the state of the prior art, a transport apparatus according to the present invention for transporting one or more objects comprises a reference surface, electric energizing means to selectively generate one or more magnetic fields associated with the reference surface, at least one transport member to support and transport the one or more objects and able to move without contact with respect to the reference surface, remaining at a certain distance from the latter, wherein the at least one transport member comprises first magnetic means and wherein the electric energizing means are configured to interact with the first magnetic means and consequently cause the selective displacement of the at least one transport member.

In particular, thanks to the cooperation between the electric energizing means and the first magnetic means, the at least one transport member can move independently, without contact and without constraint on direction or path, on the reference surface.

The reference surface can be either vertical or horizontal, or inclined by a certain angle with respect to a horizontal or vertical plane.

In accordance with one aspect of the present invention, the transport apparatus comprises second magnetic means comprising at least one magnetic device configured to assume at least a first condition in which the magnetic device is inactive and does not interact with the first magnetic means, and at least a second condition in which the magnetic device is active and generates a magnetic attraction force suitable to interact with the first magnetic means in order to block the transport member with respect to the reference surface when the correct interaction between the electric energizing means and the first magnetic means is missing.

The second magnetic means are configured as safety means, configured to intervene when a correct interaction between the electric energizing means and the magnetic means is missing, so as to prevent any damage to the at least one transport member and guarantee the movement of the latter, without contact, with respect to the reference surface when the correct interaction between the electric energizing means and the magnetic means is restored.

In particular, the second magnetic means can be configured to intervene autonomously, or under the control of control means, when any critical situation occurs in which the first magnetic means do not interact correctly with the magnetic fields generated by the electric energizing means.

A critical situation can occur whenever the magnetic fields are not sufficient to exert a magnetic attraction force sufficient to overcome the force of gravity acting on the transport member and the object supported thereby, and keep the transport member at a desired distance with respect to the reference surface.

Possible critical situations can be, for example, the interruption of the supply of electrical energy to the electric energizing means, with consequent cancelling out of the magnetic fields, a loss of control of one or more transport devices, even without the interruption of electrical energy, for example caused by excessive dynamic performance demands on the transport devices, such as for example in the case of dynamic thrusts, unbalanced loads, greater loads than expected, which can lead to an unbalancing of the transport member with respect to the reference surface, whereby one or more of the first magnetic means fail to interact with the magnetic fields, or even a possible collision between two or more transport members.

Furthermore, another possible critical situation can comprise the collision, or unwanted interaction, between one of the transport members and another machine member or, possibly, with an operator.

The collisions can occur, for example, due to an overload of the transport member, caused by an excessive weight of the objects transported, for example due to an unexpected and sudden increase in such weight, with a consequent reduction in speed and/or deviation of the transport member with respect to a predefined path.

In accordance with another aspect of the present invention, the magnetic device comprises a plurality of fixed permanent magnets and at least one mobile permanent magnet, which is mobile between at least a first position in which it is offset with respect to the fixed permanent magnets when the magnetic device assumes the first condition, and a second position in which it is aligned with them when the magnetic device assumes the second condition.

In accordance with another aspect of the present invention, the mobile permanent magnet is connected to an actuation member commanded by a command member configured to command the actuation member in order to displace the at least one mobile permanent magnet between the first and the second position, and consequently take the magnetic device from the first condition to the second condition.

The actuation member can advantageously be of the pneumatic type, so that it can rapidly and effectively displace the mobile permanent magnet in order to take the magnetic device into the second condition, in which it is active.

In accordance with another aspect of the present invention, the plurality of fixed permanent magnets and the at least one mobile permanent magnet are disposed coplanar with each other.

In accordance with another aspect of the present invention, the magnetic device is of the electropermanent type and comprises a plurality of fixed permanent magnets and at least one invertible permanent magnet which is associated with a winding through which an electric current can pass, wherein the invertible magnet is configured to invert the polarity of a generated magnetic field as a function of the sense of the electric current passing through the winding, so as to take the magnetic device from the first condition to the second condition.

In accordance with another aspect of the present invention, the apparatus also comprises a circuit that can be commanded by means of a command member configured to invert the sense of the electric current when the magnetic device has to be taken from the first condition to the second condition.

In accordance with another aspect of the present invention, the apparatus also comprises control means configured both to monitor a trajectory of the transport member with respect to a predefined path on the basis of data received from position sensors which are associated with at least one of either the reference surface or the at least one transport member, and also to activate the command member when the trajectory does not coincide with the predefined path.

In accordance with another aspect of the present invention, the second magnetic means can intervene either passively, that is, automatically, for example in the event of an interruption in the supply of electrical energy, or actively, that is, following a command given by the control means, for example in the event that situations of possible collision or unbalancing of the transport member occur. In embodiments in which the second magnetic means intervene passively, the command member comprises a switch device configured to activate autonomously in the absence of the supply of electrical energy.

In accordance with another aspect of the present invention, the switch device comprises a relay which can be activated automatically in the absence of the supply of electrical energy, for example powered by an uninterrupted power supply unit, an emergency battery, or any other suitable power supply device whatsoever.

In accordance with another aspect of the present invention, the apparatus comprises recovery means configured to return the transport member in proximity to the wall, in a correct position along the trajectory of the predefined path, for example, following an unwanted distancing of the transport member with respect to the predefined path caused by one of the critical situations described above, which are caused by the incorrect interaction.

The presence of the recovery means advantageously allows to rapidly restore the operation of the transport apparatus following the occurrence of one of the critical situations described above.

In accordance with another aspect of the present invention, the second magnetic means can be integrated in a support structure which encloses the electric energizing means, and which defines the reference surface. In accordance with another alternative embodiment of the present invention, the second magnetic means are externally associated with the support structure in which the electric energizing means are disposed.

The second magnetic means can be disposed between the electric energizing means and the reference surface, or below the electric energizing means; moreover, as a function of the position of the second magnetic means with respect to the reference surface, electromagnets of different sizes can be provided, suitable to generate electromagnetic fields with different intensities and such as to guarantee a magnetic attraction force suitable to block the at least one transport member.

In accordance with another aspect of the present invention, the second magnetic means can be disposed over the entire reference surface, for example according to a grid-like or lattice-like disposition having a plurality of links, in which each link has a smaller extension than the area of action of the first magnetic means of the at least one transport member.

In accordance with other aspects of the present invention, the second magnetic means are concentrated in a plurality of strips disposed parallel to each other which extend substantially for the entire development of the reference surface, or which are distributed according to a checkerboard or dotted pattern.

In accordance with another aspect of the present invention, the second magnetic means are concentrated in a strip, preferably horizontal, disposed in a lower zone of the reference surface, that is, below the surface along which the transport members normally move.

DESCRIPTION OF THE DRAWINGS

These and other aspects, characteristics and advantages of the present invention will become apparent from the following description of some embodiments, given as a non-restrictive example with reference to the attached drawings wherein.

Figures 1, 2, 3, 4, 5:
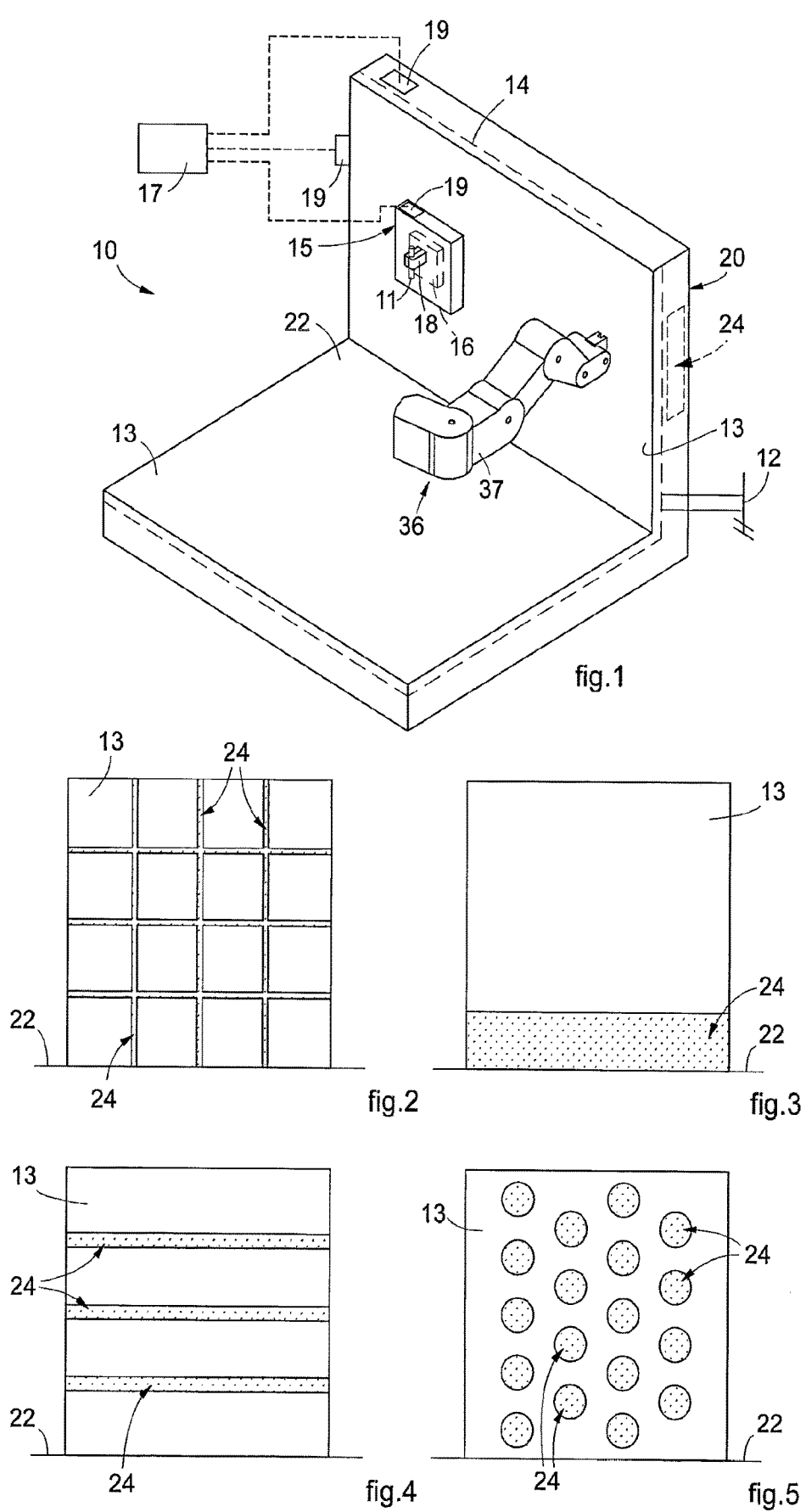
FIG. 1 is a three-dimensional schematic view of an apparatus for transporting objects, according to the present invention, in accordance with a first embodiment.
Figure 8:
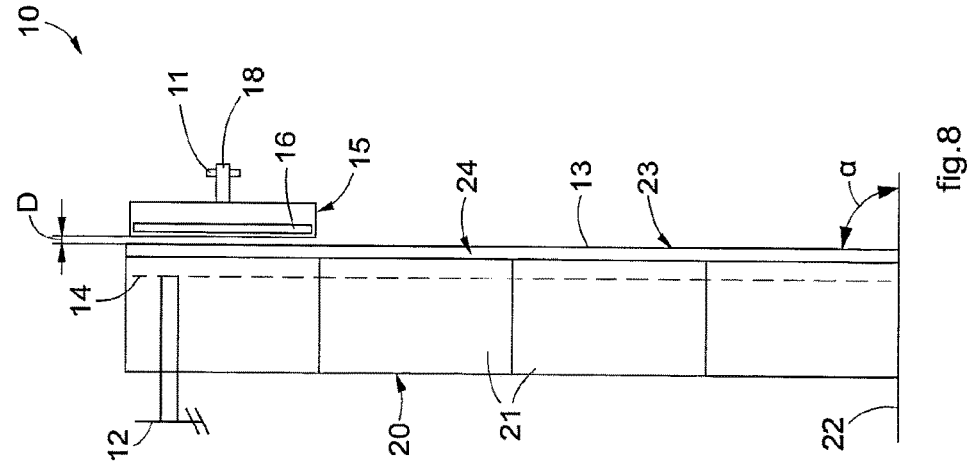
Figure 7:
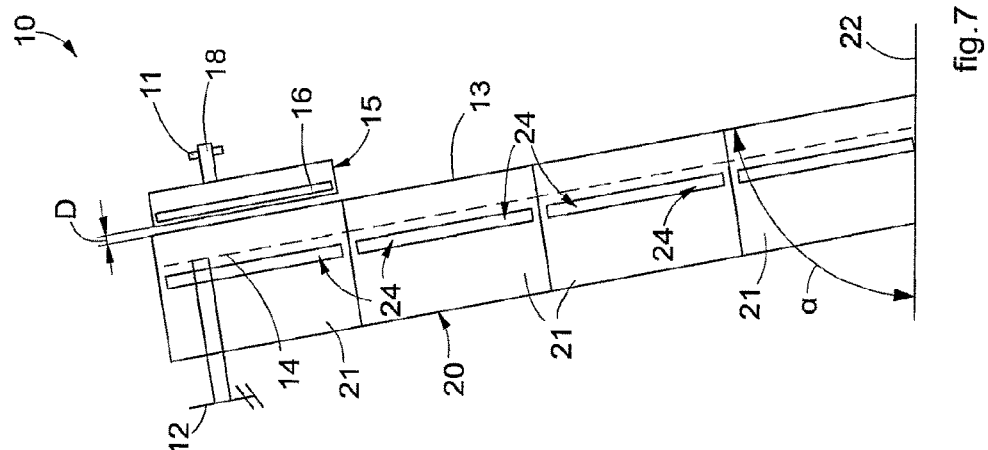
Figure 6:
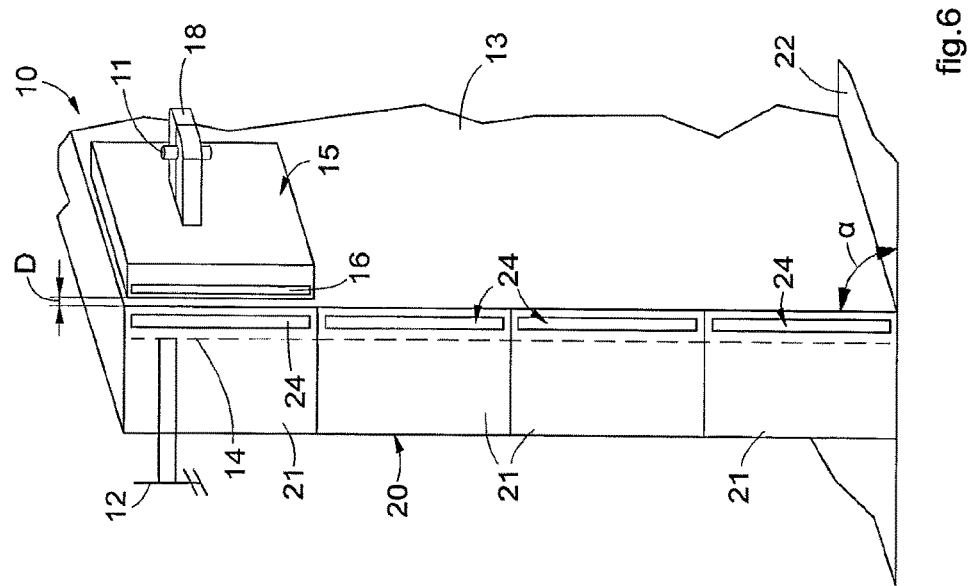

FIGS. from 2 to 5 show schematic examples of possible distribution models of second magnetic means comprised in the apparatus according to the invention, with respect to a reference surface of an apparatus according to the invention;

FIG. 6 is a schematic, partly sectioned three-dimensional view of the apparatus of FIG. 1;

FIG. 7 is a schematic lateral view of an apparatus for transporting objects according to the invention, in accordance with a second embodiment;

FIG. 8 is a schematic lateral view of an apparatus for transporting objects according to the invention, in accordance with a third embodiment;

FIGS. 9 and 10 are schematic views of an apparatus for transporting objects in accordance with a first embodiment, with the second magnetic means disposed in two different operating conditions;

FIGS. 11 and 12 are schematic views of an apparatus for transporting objects in accordance with a second embodiment, with the second magnetic means disposed in two different operating conditions.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

With reference to FIG. 1, an apparatus 10 according to the present invention is configured to automatically transport one or more objects 11 according to desired paths or directions, from a starting point to an arrival point.

The apparatus 10 can be used, for example, in a machine for packaging chemical, cosmetic and/or pharmaceutical products to and from one or more processing stations.

The one or more objects 11 can comprise containers usable in the chemical, medical and pharmaceutical fields, for example flasks, bottles or even dosing nozzles configured to fill such containers.

The machine, which is not shown in the drawings, can be, for example, of the type described in international patent application WO2021/001863A1 filed by the Applicant, and essentially comprises a plurality of processing stations, disposed in a direction of feed having rectilinear and/or curved segments.

The apparatus 10 comprises a support structure 20 having a reference surface 13 which can be, for example, either vertical (FIGS. 1, 6 and 8), or horizontal (FIG. 1), or inclined by a desired angle (FIG. 7) with respect to a horizontal or vertical plane, as well as a combination of vertical and horizontal planes (FIG. 1) or inclined and horizontal planes (not shown in the drawings).

In particular, the reference surface 13 can be inclined by an angle $\alpha$ (FIG. 6), which can have any value whatsoever, with respect to a base wall 22.

The base wall 22 can be any substantially horizontal wall whatsoever, for example of the apparatus 10 or of the machine in which the latter is installed, or the floor on which the machine itself rests, or possibly a horizontal reference surface 13.

The reference surface 13 can possibly comprise a combination of inclined surfaces and be either flat, curved, wavy or irregular (these are not shown in the drawings, but can be easily understood by a person of skill in the art) and can, in some embodiments of the present invention, also have any magnetic discontinuity.

Electric energizing means 14 are associated with the reference surface 13, of a known type and not shown in detail, which are configured to selectively generate one or more magnetic fields, even distributed locally, in determinate zones of the reference surface 13.

For example, the electric energizing means 14 comprise a plurality of electric coils or windings, not shown in the drawings, suitably disposed to cooperate with the reference surface 13 and connected, during use, to a network 12 for the supply of electrical energy having suitable values of electric voltage and current.

The electric energizing means 14 can be disposed inside a support structure 20, the external surface of which can define the reference surface 13.

The support structure 20 can be in a single body (FIG. 1) and contain inside it a plurality of electric energizing means 14 disposed according to a predefined pattern, or it can be made with a plurality of modules 21 (FIGS. from 6 to 8), each comprising its own electric energizing means 14, disposed adjacent to each other. In the latter case, the reference surface 13 is defined as a whole by the surfaces of the modules 21.

A plurality of transport members 15 is associated with the reference surface 13, of which only one is schematically shown in the attached drawings, which are moved with respect to the reference surface 13 thanks to the magnetic fields generated by the electric energizing means 14.

For example, the transport members 15 can be with a base, that is, a plan, that is polygonal, regular or irregular, in particular quadrangular, for example square or rectangular, or have other polygonal shapes defined by a closed broken line or by a combination of rectilinear and curved lines.

In some embodiments of the present invention, each transport member 15 is provided with first magnetic means 16, such as permanent magnets for example, of a known type and not shown in detail in the drawings.

The first magnetic means 16 are configured to interact with one or more of the magnetic fields generated by the electric energizing means 14, so that each transport member 15 can move autonomously with respect to the reference surface 13 and slightly distanced with respect thereto, that is, without contact.

By way of example, during the displacement, the transport member 15 can remain at a distance D comprised between 0.2 and 4.5 mm with respect to the reference surface 13 (FIGS. 6-8 and 11).

We must clarify that in the present description by the expression "distance D" we mean a distance, constant or variable, such as to allow a correct interaction between the electric energizing means 14 and the first magnetic means 16, and therefore comprised in the range of reference values disclosed above.

The transport members 15 are preferably made as the mobile parts of magnetically driven "planar motors", per se known in the state of the art.

The transport members 15 are configured to be translated and/or rotated with respect to the reference surface 13, as well as independently and without contact, also without any constraint on path or direction whatsoever, advantageously with several degrees of freedom.

The transport members 15 can be provided with support means 18 for temporarily sustaining one or more objects 11. These support means 18 can be of a known type and comprise gripping means suitable to each grip a single object 11 or a tray or a container on which a plurality of objects 11 is positioned.

The apparatus 10 also comprises control means, for example consisting of, or comprising, a control unit 17 (FIGS. 1, 9 and 10), which controls the selective energizing of the electric energizing means 14 in relation to the path or trajectory that the or each transport member 15 has to follow.

The control unit 17 can comprise, for example, one or more processors, of a type known per se and programmable. In particular, the control unit 17 is able to control, selectively and in a programmed manner, the values of electric current and/or voltage to be supplied to the electric energizing means 14, so that the latter can generate magnetic fields suitable to cause both the support of each transport member 15 in a determinate position of the reference surface 13, and also the selective movement of each support member 15 along the reference surface 13, according to a predefined path.

According to some embodiments of the present invention, the apparatus 10 also comprises position sensors 19 associated with at least one of either the reference surface 13 or the at least one transport member 15, suitable to detect one or more of either the position, the speed of advance or possibly other parameters correlated to the movement of the at least one, or of each, transport member 15, and transmit the data to the control unit 17.

In this way, the control unit 17 can carry out a feedback control of the electric energizing means 14 in order to move each transport member 15 according to a respective path.

According to one aspect of the present invention, the transport apparatus 10 comprises second magnetic means 24 configured to intervene autonomously, or under the control of the control unit 17, in order to interact with the first magnetic means 16 of one or more transport members 15 when critical situations occur in which the first magnetic means 16 do not interact correctly with the magnetic fields generated by the electric energizing means 14.

In particular, the second magnetic means 24 interact with the first magnetic means 16 in such a way as to stop and block the respective transport member 15 in a certain position, so as to prevent or stop a fall of the transport member 15 caused by the weight force, before it comes into contact with the base wall 22 or, in general, an uncontrolled movement of the transport member 15 with respect to the reference surface 13.

According to some embodiments of the present invention, the second magnetic means 24 can be associated with the reference surface 13.

According to one possible embodiment, the second magnetic means 24 can be integrated inside the support structure 20, or the modules 21 that compose it.

The second magnetic means 24 and the electric energizing means 14 can be at least partly overlapping with each other in the thickness of the support structure 20 (FIGS. 6 and 7).

According to possible variants, not shown, the second magnetic means 24 can be disposed offset with respect to the electric energizing means 14 on a common lying plane.

According to other variants, for example described with reference to FIG. 8, the second magnetic means 24 can be disposed outside the support structure 20, integrated in a plane or panel 23 associated therewith. In this case, an external surface of the plane or panel 23 defines the reference surface 13.

FIGS. from 2 to 5 show possible examples of disposition patterns of the second magnetic means 24 with respect to the reference surface 13.

For example, according to the embodiment shown in FIG. 2, the second magnetic means 24 can be distributed according to a grid or lattice-like conformation in which a plurality of links are defined. In this case, it can be provided that the size of the links is smaller than the size of the area of action of the first magnetic means 16 of a transport member 15, in order to always guarantee a correct blocking of the latter if required. By the expression "area of action" we mean the area within which there is an interaction between the first magnetic means 16 and the magnetic fields generated by the electric energizing means 14. This "area of action" can substantially correspond to the size of the first magnetic means 16 on a plane parallel to the reference surface 13.

According to the embodiment shown in FIG. 3, the second magnetic means 24 can be concentrated in a strip, or band, disposed in a lower zone of the reference surface 13, so as to stop the fall of a transport member 15 before it reaches the base wall 22.

According to the embodiment of the present invention shown in FIG. 4, the second magnetic means 24 can be concentrated in a plurality of strips, or bands, disposed parallel to each other with respect to the reference surface 13. Also in this case, the distance between the strips, or bands, is preferably smaller than the area of action of the magnetic means 16 of the transport members 15. Although in FIG. 7 the strips are disposed horizontally, it is clear that they can also be disposed vertically, or possibly inclined by an angle other than 90°.

In accordance with another embodiment of the present invention, for example described with reference to FIG. 5, the second magnetic means 24 can also be distributed according to a dotted pattern, or possibly a checkerboard pattern.

Although some examples are shown in FIGS. 2 to 5, it is clear that the second magnetic means 24 can be disposed according to a plurality of different patterns.

The second magnetic means 24 can be selectively activated to cooperate with the first magnetic means 16.

The second magnetic means 24 comprise one or more magnetic devices 26, 126 configured to assume at least a first inactive condition in which they do not interact with the first magnetic means 16, and at least a second active condition in which they exert a magnetic attraction force suitable to interact with the first magnetic means 16 and block the transport member 15 with which they are associated, adhering to the reference surface 13 or below it.

In accordance with one embodiment of the present invention, for example described with reference to FIGS. 9 and 10, the magnetic device 26 comprises a plurality of fixed permanent magnets 27 and at least one mobile permanent magnet, 28, between at least a first position offset with respect to the fixed permanent magnets 27 (FIG. 9) and a second position aligned with them (FIG. 10).

When the mobile permanent magnet 28 is in the first position, the magnetic device 26 is in the inactive condition, while when the mobile permanent magnet 28 is in the second position, the magnetic device 26 is in the active condition.

The apparatus 10 comprises an actuation member 29 connected to the at least one mobile permanent magnet 28 in order to move it between the first and second position, and vice versa, and a command member 30 connected to the actuation member 29 to activate the latter.

The actuation member 29 can advantageously be of the pneumatic type, so as to be able to move the mobile permanent magnet 28 rapidly and effectively.

According to some embodiments of the present invention, the second magnetic means 24 can be configured to intervene either passively, that is, automatically, for example in the event of an interruption in the supply of electrical energy, or actively, that is, following a command given by the control unit 17, for example in the event situations of possible collision or imbalance of the transport member 15 occur.

In other words, the command member 30 can be activated automatically or by the control unit 17.

According to some embodiments of the present invention, the command member 30 can comprise a switch device 34 of the relay type, configured to be activated automatically in the absence of supply of electrical energy.

According to other embodiments of the present invention, the control unit 17 can actively command the command member 30 if it detects possible critical situations.

For example, the control unit 17 can be configured to constantly monitor the trajectory of the transport member 15 in terms of position and speed with respect to a predefined path, based on the data received from the position sensors 19, and activate the switch device 34 when the detected trajectory does not coincide with the expected one.

In this way, it is possible to intervene both in the event the transport member 15 is starting to slide downward due to the weight force, and also in the event it slows down its travel and/or modifies its trajectory, so as to prevent both potential falls as well as potential collisions between two or more transport members 15.

When the switch device 34 is commanded actively, the control unit 17 can simultaneously deactivate the electric energizing means 14.

FIGS. 10 and 11 show a second embodiment, in which the second magnetic means 24 comprise at least one magnetic device 126 of the electropermanent type, configured to generate an electromagnetic field without needing to be continuously supplied with electrical energy.

The magnetic device 126 comprises permanent magnets 31 and at least one invertible magnet 32, on which at least one coil or winding 33 is wound, formed by a plurality of turns of electric wire.

The polarity of the invertible magnet 32 varies as a function of the sense of the electric current passing in the winding 33, and with it the direction of the magnetic field generated, taking the magnetic device 126 from the inactive condition (FIG. 11) to the active condition (FIG. 12), and vice versa.

The blocking and hold of the transport member 15 are guaranteed by the magnetic field generated by the invertible magnet 32. It is therefore sufficient to provide an electric current only during a short transient change in the polarity of the invertible magnet 32, without needing to request a continuous supply of electric current.

Also in this embodiment, the apparatus 10 comprises a command member 30 connected to the winding 33 by means of a circuit 35 and configured to modify the sense of the current passing in the winding 33.

Also in this case, the command member 30 can comprise a switch device 34 of the relay type configured to be activated automatically if the supply of electrical energy is missing, or to be commanded actively by the control unit 17 in the event potential critical situations are recognized.

According to the embodiment shown in FIG. 1, the apparatus 10 comprises recovery means 36 configured to automatically return the transport member 15 in proximity to the reference wall 13 and in a correct position along the trajectory of the predefined path, for example, following an unwanted distancing of the transport member 15 with respect to the predefined path caused by one of the critical operating situations described above.

For example, the recovery means 36 could comprise an anthropomorphic robot 37 and/or a mechanical arm, configured to return the transport member 15 to the desired distance D from the reference wall 13.

According to other embodiments, not shown in the attached drawings, the recovery means 36 could be of the manual type, for example able to be selectively activated by an operator.

The presence of the recovery means 36 advantageously allows to rapidly restore the operation of the transport apparatus 10 following the occurrence of one of the critical operating situations.

It is clear that modifications and/or additions of parts may be made to the apparatus 10 as described heretofore, without departing from the field and scope of the present invention, as defined by the claims.

For example, the person of skill in the art will easily understand that the recovery means 36 can be associated with all the embodiments described here, even if they are not shown in the attached drawings.

It is also clear that, although the present invention has been described with reference to some specific examples, a person of skill in the art shall certainly be able to achieve other equivalent forms of apparatus 10 for transporting objects, having the characteristics as set forth in the claims and hence all coming within the field of protection defined thereby.

In the following claims, the sole purpose of the references in brackets is to facilitate their reading and they must not be considered as restrictive factors with regard to the field of protection defined by the claims.

The invention claimed is:

1. Transport apparatus for transporting one or more objects comprising: a reference surface; electric energizing means to selectively generate one or more magnetic fields associated with said reference surface; and at least one transport member configured to support and transport said one or more objects and to be able to move without contact with respect to said reference surface, remaining at a distance from the latter, wherein said at least one transport member comprises first magnetic means and wherein said electric energizing means are configured to interact with said first magnetic means and consequently cause the selective displacement of said at least one transport member, and second magnetic means comprising at least one magnetic device configured to assume a first condition in which said magnetic device is inactive and a second condition in which said at least one magnetic device is active and generates a magnetic attraction force suitable to interact with said first magnetic means in order to block said transport member with respect to said reference surface when a correct interaction between said electric energizing means and said first magnetic means is missing.

2. Transport apparatus as in claim 1, wherein said at least one magnetic device comprises a plurality of fixed permanent magnets and at least one mobile permanent magnet, which is mobile between at least a first position in which it is offset with respect to said fixed permanent magnets when the magnetic device assumes said first condition, and a second position in which it is aligned with them when the magnetic device assumes said second condition, wherein said at least one mobile permanent magnet is connected to an actuation member commanded by a command member configured to command said actuation member in order to displace said at least one mobile permanent magnet between said first and said second position, and consequently take said magnetic device from said first condition to said second condition.

3. Transport apparatus as in claim 2, wherein said plurality of fixed permanent magnets and said at least one mobile permanent magnet are disposed coplanar with each other.

4. Transport apparatus as in claim 1, wherein said at least one magnetic device comprises a plurality of permanent magnets and at least one invertible magnet which is associated with a winding, wherein said invertible magnet is configured to invert the polarity of a generated magnetic field as a function of the sense of the electric current passing through said winding so as to take said magnetic device from said first condition to said second condition.

5. Transport apparatus as in claim 4, it also comprises further comprising a circuit that can be commanded by means of a command member configured to invert the sense of said electric current when said magnetic device has to be taken from said first condition to said second condition.

6. Transport apparatus as in claim 2, wherein said command member comprises a switch device configured to activate autonomously in the absence of a supply of electrical energy.

7. Transport apparatus as in claim 2, further comprising control means configured both to monitor a trajectory of said transport member with respect to a predefined path on the basis of data received from position sensors which are associated with at least one of either said reference surface or said at least one transport member, and also to activate said command member when said trajectory does not coincide with said predefined path.

8. Transport apparatus as in claim 1, wherein said second magnetic means are integrated in a support structure which encloses said electric energizing means.

9. Transport apparatus as in claim 1, wherein said second magnetic means are externally associated with a support structure in which said electric energizing means are disposed.

10. Transport apparatus as in claim 1, wherein said second magnetic means are distributed over the entire reference surface according to a grid-like disposition having a plurality of links, wherein each of said links has a smaller extension than the area of action of said first magnetic means of said at least one transport member.

11. Transport apparatus as in claim 1, wherein-said second magnetic means are concentrated in a strip disposed in a lower zone of said reference surface.

12. Transport apparatus as in claim 1, wherein said second magnetic means are concentrated in a plurality of strips disposed parallel to each other which extend substantially for the entire development of said reference surface.

13. Transport apparatus as in claim 1, wherein said second magnetic means are distributed according to a dotted or checkerboard pattern.

14. Transport apparatus as in claim 1, further comprising recovery means configured to return said transport member in proximity to said reference surface and in a correct position along a predefined trajectory following a displacement with respect thereto caused by the lack of said correct interaction.

* * * * *